June 6, 1961  C. R. ODDEN  2,987,031
DUAL PROPELLER PROPULSION

Filed July 24, 1959  2 Sheets-Sheet 2

INVENTOR.
CONRAD R. ODDEN
BY
*J. R. Sheehan*
ATTORNEY

United States Patent Office 2,987,031
Patented June 6, 1961

2,987,031
DUAL PROPELLER PROPULSION
Conrad R. Odden, 5223 Easton Drive, Springfield, Va.
Filed July 24, 1959, Ser. No. 829,471
2 Claims. (Cl. 115—37)
(Granted under Title 35, U.S. Code (1952), sec. 266)

The invention described herein may be manufactured and used by or for the Government of the United States of America for governmental purposes without the payment of any royalties thereon or therefor.

This invention relates to ship propulsion and in particular to a ship propulsion drive utilizing plural contra-rotating propellers.

One object is to provide a right angle drive for the propeller mechanism which is arranged to provide for lubrication of the mechanism by sea water.

Another object is to provide a drive for the propeller mechanism which reduces or eliminates the customary drive shaft seals.

Other objects will become apparent from a more detailed explanation of the invention.

Referring to the drawings.

Figure 1:
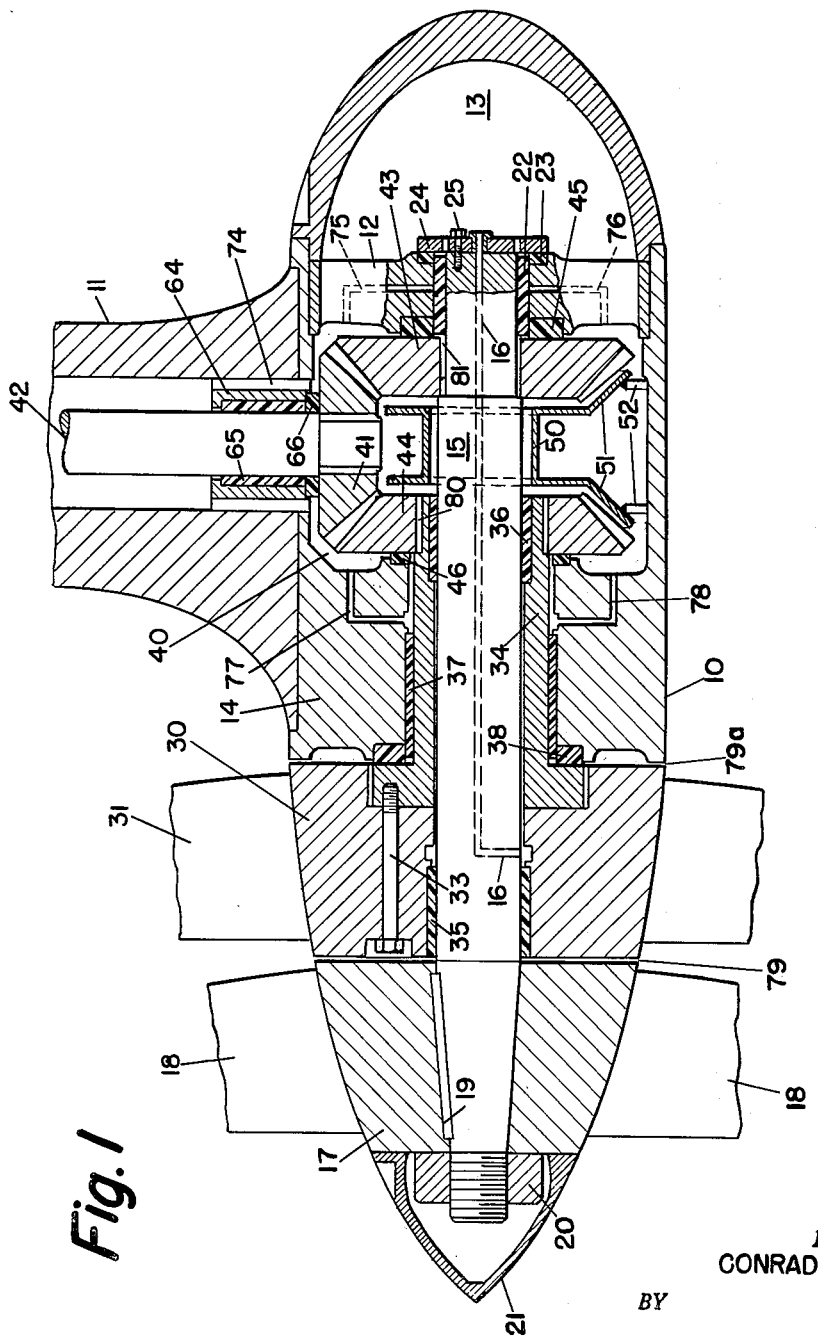
FIG. 1 is a vertical sectional view of a portion of the propeller mechanism showing details.

In FIG. 1 of the drawings, there is shown in vertical section one arrangement for mounting the propellers and the driving mechanism therefor, and in which the numeral 10 indicates a horizontally disposed casing which will be fixedly supported by a vertical housing 11 to a ship's hull. At the forward end of the casing, an apertured support, for example, a spider 12 provides an end fluid space 13 and the casing at its rearward end provides an inwardly extending annular flange 14. The spider 12 mounts the forward end portion of an inner rotatable propeller shaft 15 while the rearward end portion of shaft 15 extends through and rearwardly of the annular flange 14. The shaft 15 is provided with an axial passageway 16 which is in communication at its forward end with the fluid space 13 and the passageway 16 also communicates through the shaft wall as shown for a purpose to be described. The rearward end portion of shaft 15 is tapered and fixedly receives the hub 17 of propeller blading 18 by means of a key 19 while a lock-nut 20, which may be covered by a cap 21 for streamlining, is provided to rigidly secure other elements in operative position about the shaft 15. The forward end portion of shaft 15 is mounted in a cylindrical bearing 22 and an annular thrust bearing 23 is positioned at the shaft end, both of which bearings may be of a cloth impregnated phenolic type and held in place by a thrust retainer plate 24 by screw means 25. The retainer plate is centrally apertured to provide communication between the passageway 16 and fluid space 13.

The zone or space between the spider 12 and propeller hub 17 receives other elements which are assembled about shaft 15 before the propeller hub 17 is secured and the entire assembly of elements will be maintained as an operating unit about the shaft 15.

A second propeller hub 30 carrying propeller blading 31 is supported inwardly of hub 17 by bolt connectors 33 which extend through the hub 30 and are received by a gland 34 which provides an outer shaft 34 which is mounted concentrically of the inner shaft 15. A cylindrical bearing 35 is disposed between the shaft 15 and the hub 30 and a second cylindrical bearing 36 is provided between the outer shaft or gland 34 to permit free rotation between the shaft 15, the propeller hub 30 and the outer shaft or gland 34. Another cylindrical bearing 37 and an annular thrust bearing 38 are positioned between the outer shaft or gland 34 and the surfaces of the casing inner flange 14 in order to permit free rotation of the outer shaft 34 relative to the casing.

A second fluid space 40 is provided in casing 10 between the spider 12 and the casing inner flange 14 and receives gear mechanism. A pinion gear 41 is fixed to the lower end of a drive shaft 42 and coacts with bevel gears 43 and 44 which are respectively fixed to the inner shaft 15 and the gland or outer shaft 34. Annular thrust bearings 45 and 46 are respectively provided between the bevel gear 43 and the spider 12 and between the bevel gear 44 and the annular flange 14 of casing 10 to assist in smoothness of operation. The gears are preferably formed of a beryllium—copper or nickel plated titanium composition—and in order to reduce gear losses shrouding in the form of a ring 50 having side plates 51—51 adapted to the configuration of the gear assembly is mounted about the shaft 15 and secured by connector means 52 to the casing 10.

Figure 2:
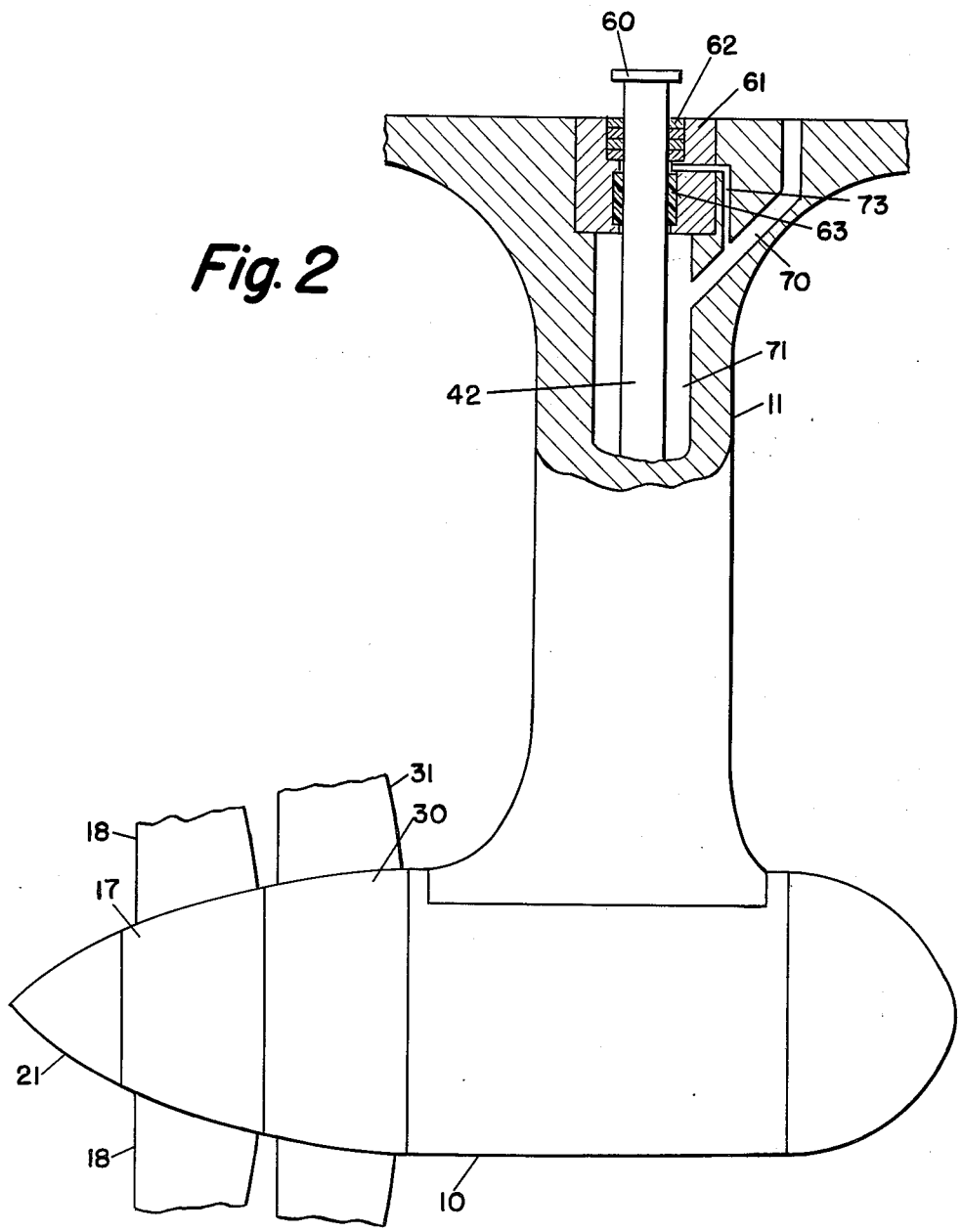
FIG. 2 is generally a diagrammatic view of the portion of FIG. 1 with an added portion sectioned to show details.

The assembly of gears 41, 43 and 44 are arranged to drive the propellers 18 and 31 simultaneously but in opposed directions through the drive shaft 42. The drive shaft 42, as shown in FIG. 2, is provided with a flanged upper end 60 to receive the driving mechanism and a seal means is provided below the flanged end and consists of a gland 61, seal rings 62 and a cylindrical phenolic bearing 63 while at the lower end of shaft 42, as shown in FIG. 1, another seal means is provided and consists of an inner sleeve 54, cylindrical phenolic bearing 65 and annular thrust bearing 66.

An important feature of the invention resides in the arrangement for hydrodynamically lubricating the phenolic bearings and rotating or other elements of the propulsion apparatus heretofore described. To this end the vertical housing 11 for drive shaft 42 has a passageway 70 for the supply of sea water to a central passageway 71 about the shaft 42 to lubricate bearing 65 and a by-pass 73 to lubricate the upper bearing 63. From the central passageway 71 the liquid flows through passageways 74 provided in sleeve 64 into a central chamber 40 which is in direct communication with chamber 13 through the spider 12. The gearing within chamber 40 will be lubricated by liquid in the chamber 40 and the bearing 22 and 45 will be lubricated by the liquid through by-passes 75 and 76 formed in the spider 12 while the bearings 36, 37 and 38 will be lubricated by means of by-passes 77 and 78 formed in the annular flange 14. The passageway 16 formed in shaft 15 transmits liquid from passageway 13 directly to bearing 35, the liquid then passing outwardly of the apparatus through space 79 while the liquid supplied to bearings 37 and 38 will pass outwardly through space 79a. Thus liquid entering through the central passageway 71 will reach all of the bearings and eventually pass outwardly of the apparatus through the spaces 79 and 79a. It will be understood that the gears 43 and 44 are fixed to the inner and outer shafts, preferably by screw-threaded connections indicated at 80 and 81 and that the shaft 15 mounts the gears and propeller hub for rotation therewith.

Although only a single embodiment of the present invention has been illustrated and described, it will be apparent to those skilled in the art that various changes and modifications may be made to the present disclosure without departing from the spirit of the invention or from the scope of the appended claims.

I claim:

1. In a marine drive for seagoing vessels, a casing having a closed front end and an open rear end formed by an inner annular flange having front and rear transverse faces, a transverse support having a central aperture therein within the casing provided a fluid chamber with said front transverse face of the inner annular flange, an inner shaft disposed axially of the casing having its front end mounted for rotation in the central aperture of said transverse support and its other end extending through said inner annular flange, said shaft having a gear receiving portion in the fluid chamber adjacent the transverse support and a propeller hub receiving portion exteriorly of the rear end of the casing, an outer tubular shaft mounted concentrically between the inner shaft and said inner annular flange, said tubular shaft having a gear receiving portion in the fluid chamber adjacent said front transverse face of the inner annular flange and a hub attaching portion disposed adjacent the rear transverse face of the inner annular flange, a pair of spaced front and rear transverse bevel gears in said fluid chamber mounted respectively on the gear receiving portions of the inner shaft and the outer shaft, a front and a rear propeller hub on said hub receiving portion of the inner shaft, means securing said front hub to said hub attaching portion of the outer shaft for rotation therewith, means securing said rear hub to the inner shaft for rotation therewith, a drive shaft mounted normal to the casing and having a bevel gear at its lower end in mesh with said front and rear transverse bevel gears, a fixed housing about said drive shaft providing a passageway in communication with said fluid chamber for supplying sea water thereto, shroud means between said transverse bevel gears and secured to the casing inner wall for preventing turbulence of the sea water in the fluid chamber, bearing means on the inner shaft and other bearing means on the outer shaft, passageways in the transverse support communicating between the fluid chamber and the first bearing means and other passageways in the inner annular flange communicating between the fluid chamber and the other bearing means whereby lubrication of said bearing means by sea water is provided.

2. In a marine drive for seagoing vessels, a casing having a closed front end and an open rear end formed by an inner annular flange of substantial axial length and having front and rear transverse faces, a transverse support having a central aperture therein within the casing providing a front fluid chamber with the closed end of the casing and a rear fluid chamber with said front transverse face of the inner annular flange, an inner shaft disposed axially of the casing having its front end mounted for rotation in the central aperture of said support and its other end extending through said inner annular flange, said shaft having a gear receiving portion in the rear fluid chamber adjacent the transverse support and a propeller hub receiving portion exteriorly of the rear end of the casing, an outer tubular shaft mounted concentrically between the inner shaft and said inner annular flange, said tubular shaft having a gear receiving portion within the rear fluid chamber adjacent the front transverse face of said inner annular flange and an outer flange disposed adjacent the rear transverse face of the inner annular flange, a pair of spaced front and rear transverse bevel gears in said rear chamber mounted respectively on the gear receiving portions of the inner shaft and the outer shaft, a front and rear propeller hub on said propeller hub receiving portion of the inner shaft, means securing said front hub to said outer flange of the outer shaft for rotation therewith, means securing said rear hub to the inner shaft for rotation therewith, a drive shaft mounted normal to the casing and having a bevel gear at its lower end in mesh with said front and rear transverse bevel gears, a fixed housing about said drive shaft providing a passageway in communication with said rear fluid chamber for supplying sea water thereto, shroud means between said transverse bevel gears and secured to the casing inner wall for preventing turbulence of the sea water in the rear chamber, a first bearing means between the inner shaft and the transverse support, a second bearing means between the inner shaft and the front propeller hub, a passageway in the transverse support communicating between the fluid chambers through the first bearing means, a passageway in the inner shaft communicating between the rear fluid chamber and the second bearing means, other bearing means on the outer shaft and a passageway in the inner annular flange communicating between the rear fluid chamber and the other bearing means whereby lubrication of all said bearing means by sea water is provided.

References Cited in the file of this patent

UNITED STATES PATENTS

| 1,813,552 | Stechauner | July 7, 1931 |
| 2,064,195 | De Michelis | Dec. 15, 1936 |
| 2,405,799 | Smeallie | Aug. 13, 1946 |
| 2,672,115 | Conover | Mar. 16, 1954 |